US011100916B2

(12) United States Patent
Lee

(10) Patent No.: US 11,100,916 B2
(45) Date of Patent: Aug. 24, 2021

(54) SPEECH RECOGNITION METHOD AND APPARATUS

(71) Applicant: Samsung Electronics Co., Ltd., Suwon-si (KR)

(72) Inventor: Jihyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 133 days.

(21) Appl. No.: 16/398,482

(22) Filed: Apr. 30, 2019

(65) Prior Publication Data

US 2020/0160838 A1 May 21, 2020

(30) Foreign Application Priority Data

Nov. 21, 2018 (KR) .................. 10-2018-0144753

(51) Int. Cl.
*G10L 15/183* (2013.01)
*G10L 15/16* (2006.01)
*G10L 15/02* (2006.01)
*G10L 15/00* (2013.01)
*G10L 15/06* (2013.01)
*G10L 15/26* (2006.01)

(52) U.S. Cl.
CPC ............ *G10L 15/02* (2013.01); *G10L 15/005* (2013.01); *G10L 15/06* (2013.01); *G10L 15/16* (2013.01); *G10L 15/183* (2013.01); *G10L 15/26* (2013.01)

(58) Field of Classification Search
CPC .................................................. G10L 15/183
See application file for complete search history.

(56) References Cited

U.S. PATENT DOCUMENTS

| 8,069,032 B2 | 11/2011 | Odell et al. |
| 8,352,245 B1 | 1/2013 | Lloyd |
| 8,447,608 B1 | 5/2013 | Chang et al. |
| 9,208,779 B2 | 12/2015 | Sak et al. |
| 9,324,323 B1 * | 4/2016 | Bikel ............... G10L 15/197 |
| 9,697,821 B2 | 7/2017 | Rao et al. |

(Continued)

FOREIGN PATENT DOCUMENTS

| EP | 3 355 303 A1 | 8/2018 |
| JP | 2004-198831 A | 7/2004 |

(Continued)

OTHER PUBLICATIONS

Extended European Search Report dated Oct. 29, 2019 in counterpart European Patent Application No. 19179693.7 (9 pages in English).

*Primary Examiner* — Jialong He
(74) *Attorney, Agent, or Firm* — NSIP Law

(57) ABSTRACT

A speech recognition method and apparatus are disclosed. The speech recognition method includes determining a first score of candidate texts based on an input speech, determining a weight for an output of a language model based on the input speech, applying the weight to a second score of the candidate texts output from the language model to obtain a weighted second score, selecting a target candidate text from among the candidate texts based on the first score and the weighted second score corresponding to the target candidate text, and determining the target candidate text to correspond to a portion of the input speech.

28 Claims, 11 Drawing Sheets

(56) References Cited

U.S. PATENT DOCUMENTS

| | | | |
|---|---|---|---|
| 2002/0111806 A1* | 8/2002 | Franz | G10L 15/18 |
| | | | 704/255 |
| 2005/0159952 A1 | 7/2005 | Nguyen et al. | |
| 2015/0370787 A1* | 12/2015 | Akbacak | G06F 40/47 |
| | | | 704/2 |
| 2016/0019887 A1* | 1/2016 | Kim | G10L 15/183 |
| | | | 704/246 |
| 2016/0086599 A1* | 3/2016 | Kurata | G10L 15/19 |
| | | | 704/243 |
| 2016/0104482 A1* | 4/2016 | Aleksic | G10L 19/00 |
| | | | 704/235 |
| 2016/0342682 A1 | 11/2016 | Moreno Mengibar et al. | |
| 2017/0069314 A1* | 3/2017 | Mun | G10L 15/183 |
| 2017/0154033 A1 | 6/2017 | Lee | |
| 2017/0301352 A1 | 10/2017 | Strohman et al. | |
| 2018/0053502 A1 | 2/2018 | Biadsy et al. | |
| 2018/0190268 A1* | 7/2018 | Lee | G10L 15/02 |
| 2019/0318725 A1* | 10/2019 | Le Roux | G10L 25/30 |

FOREIGN PATENT DOCUMENTS

| | | |
|---|---|---|
| JP | 4836076 B2 | 12/2011 |
| KR | 10-2012-0066530 A | 6/2012 |
| KR | 10-1597289 B1 | 3/2016 |
| KR | 10-2016-0066441 A | 6/2016 |
| KR | 10-2018-0038707 A | 4/2018 |

* cited by examiner

SPEECH RECOGNITION METHOD AND APPARATUS

CROSS-REFERENCE TO RELATED APPLICATIONS

This application claims the benefit under 35 USC 119(a) of Korean Patent Application No. 10-2018-0144753 filed on Nov. 21, 2018, in the Korean Intellectual Property Office, the entire disclosure of which is incorporated herein by reference for all purposes.

BACKGROUND

1. Field

The following description relates to speech recognition.

2. Description of Related Art

Speech recognition has been automated through processor-implemented neural network models, as specialized computational architectures, which after training may provide computationally intuitive mappings between input patterns and output patterns. The trained capability of generating such mappings may be referred to as a learning capability of the neural network. Because of the specialized training, such specially trained neural networks have a capacity to generate a relatively accurate output for an input pattern that the neural network may not have been trained for. However, because such operations or applications are performed through specialized computational architectures, and in different automated manners than they would have been performed in non-computer implemented or non-automated approaches, some issues arise because of the automated and specialized manner of computational architecture that are used to implement the neural networks.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a speech recognition method including determining a first score of candidate texts based on an input speech, determining a weight for an output of a language model based on the input speech, applying the weight to a second score of the candidate texts output from the language model to obtain a weighted second score, selecting a target candidate text from among the candidate texts based on the first score and the weighted second score corresponding to the target candidate text, and determining the target candidate text to correspond to a portion of the input speech.

The determining of the weight may include determining a weight to be applied to an output of the language model at a current time based on the input speech and a target text determined at a previous time.

The target text determined at the previous time may include any one or any combination of target texts determined from a time at which speech recognition may be initiated to a time immediately before the current time.

The determining of the weight may include determining the weight based on the input speech and context information.

The context information may include any one or any combination of information on a user inputting the input speech, time information, location information, language information, speech recognition history information, and information on a currently operating application program.

The determining of the weight may include determining a weight to be applied to an output of the language model at a current time based on the input speech, a target text determined at a previous time, and context information.

The selecting of the target candidate text may include selecting a candidate text having a greatest sum of the first score and the weighted second score as the target candidate text from the candidate texts.

The determining of the weight may include extracting a feature value from the input speech, and providing the feature value to a neural network-based weight determiner to determine the weight.

The determining of the first score may include extracting a feature value from the input speech using a neural network-based encoder, and determining a first score of each of the candidate texts from the extracted feature value using a neural network-based decoder.

The language model may include a plurality of language models, wherein the determining of the weight may include determining a weight to be applied to an output of each of the plurality of language models.

The plurality of language models may include a first language model and a second language model, wherein the first language model may be configured to output a second score of the candidate texts, and the second language model may be configured to output a third score of the candidate texts, wherein the determining of the weight may include determining a first weight to be applied to the second score and a second weight to be applied to the third score, and the selecting of the target candidate text may include selecting the target candidate text based on the first score, the second score to which the first weight may be applied, and the third score to which the second weight may be applied.

The language model may include a plurality of language models, and the determining of the weight may include selecting at least one language model from among the plurality of language models, and determining a weight to be applied to an output of the selected at least one language model.

The language model may be configured to output a second score corresponding to each of the candidate texts to determine, based on a target text determined at a previous time, a next target text subsequent to the target text determined at the previous time.

Each of the candidate texts may be one of a word, a subword, a phrase, or a sentence.

The weigh may be adjusted based on a type of the input speech.

The determining of the first score may include determining the first score based on the input speech and an output of a neural network-based decoder at a previous time period.

The language model may be configured for a syntax of a type of device.

The language model may include a plurality of language models and a weight for each of the language models may be dynamically varied based on a type of the input speech.

The type of input speech may include any one or any combination of a context of the input speech, an environment in which the speech recognition may be performed, a type of a word in the input speech, type of device in which the speech recognition may be performed, and a type of an utterance for which the speech recognition may be performed.

In another general aspect, there is provided a speech recognition apparatus including a voice interface configured to receive an input speech from a user, and a processor configured to determine a first score of candidate texts based on the input speech, determine a weight for an output of a language model based on the input speech, apply the weight to a second score of the candidate texts output from the language model to obtain a weighted second score, select a target candidate text from among the candidate texts based on the first score and the weighted second score corresponding to the target candidate text, and recognize the target candidate text to correspond to a portion of the input speech.

The processor may be configured to determine a weight to be applied to an output of the language model at a current time based on the input speech and a target text determined at a previous time.

The processor may be configured to determine the weight based on the input speech and context information.

The processor may be configured to extract a feature value from the input speech, and determine the weight using a neural network-based weight determiner configured to output a weight corresponding to the extracted feature value.

The language model may include a first language model configured to output a second score of the candidate texts and a second language model configured to output a third score of the candidate texts, and the processor may be configured to determine a first weight to be applied to the second score and a second weight to be applied to the third score, and select the target candidate text based on the first score, the second score to which the first weight may be applied, and the third score to which the second weight may be applied.

The language model may include a plurality of language models, wherein the processor may be configured to select at least one language model to which the weight may be applied from among the plurality of language models, and determine a weight to be applied to an output of the at least one language model.

In another general aspect, there is provided a speech recognition apparatus including a sensor configured to receive a speech, a memory configured to store language models and instructions, and a processor configured to execute the instructions to implement an encoder configured to encode the speech, implement a decoder configured to determine a first score of candidate texts based on the encoded speech, implement a weight determiner configured to determine weights for each of the respective language models based on an output of the encoder, determine a second score for the candidate texts based on the respective language models, apply the weights to the second score of the candidate texts obtained from the respective language models to obtain a weighted second score, and recognize a target candidate text from among the candidate texts, to correspond to a portion of the speech, based on a sum of the first score and the weighted second score corresponding to the target candidate text.

The encoder may be further configured to extract a feature value from the speech and the decoder may be configured to output the candidate texts and the first score based on the feature value.

The weight determiner may be further configured to increase a weight of a language model corresponding to contact information stored on a device implementing the speech recognition apparatus, in response to an user name being detected in the speech.

The weight determiner may be further configured to determine the weights based on the output of the encoder and a previously determined target text.

The weight determiner may be further configured to determine the weights based on the output of the encoder and a context information, and the context information may include any one or any combination of a situation in which the speech may be made, user information, information associated with a current location, a current time, a currently operating program, a speech recognition history, and a dialog history of the user.

Each of the encoder, the decoder, and the weight determiner may be implemented on a neural network Other features and aspects will be apparent from the following detailed description, the drawings, and the claims.

Figure 1:
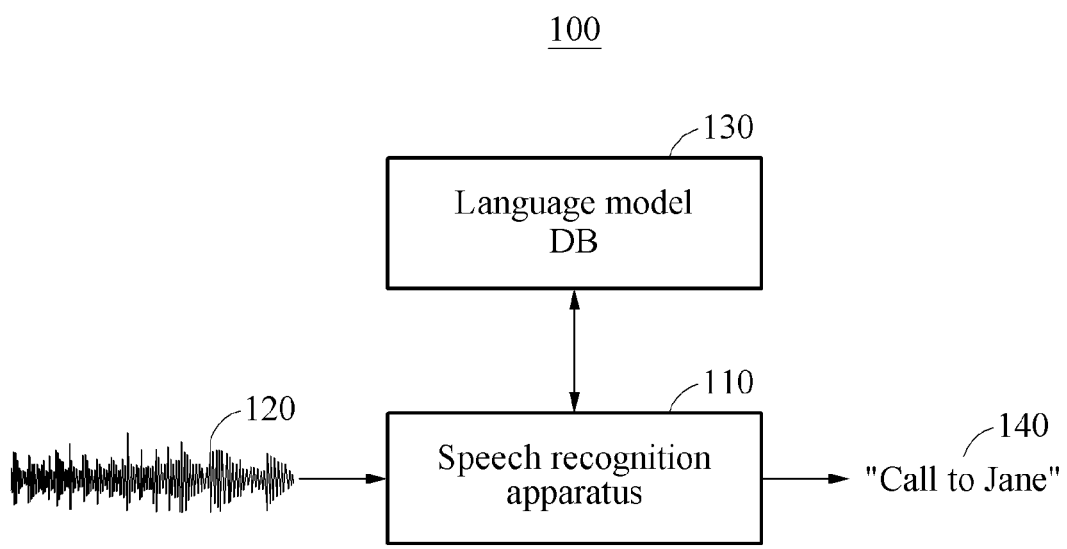
FIG. 1 is a diagram illustrating an example of a speech recognition device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, expressions, for example, "between" and "immediately between," and "adjacent to" and "immediately adjacent to" may also be construed as described in the foregoing. As used herein, the term "and/or" includes any one and any combination of any two or more of the associated listed items.

The use of the term 'may' herein with respect to an example or embodiment, e.g., as to what an example or embodiment may include or implement, means that at least one example or embodiment exists where such a feature is included or implemented while all examples and embodiments are not limited thereto.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 is a diagram illustrating an example of a speech recognition device.

Referring to FIG. 1, a speech recognition device 100 may be implemented in at least one computer including a server or a user terminal. In one example, as illustrated, a user gives a command to the speech recognition device 100 through an input speech 120, and the speech recognition device 100 analyzes the input speech 120 and estimates a text 140 corresponding to the input speech 120, for example, "call to Jane." The speech recognition device 100 extracts the command from the estimated text 140, executes the extracted command, and provides the user with a result of the executing of the command. The speech input 120 may include a sequence of words, and the sequence may include words, phrases, or sentences. The speech recognition device 100 may be applicable to various fields, such as, for example, machine translation, and human-machine interaction or dialogue, the like, in addition to recognition of a command included in an input speech of a user, as described above.

The speech recognition device 100 includes a speech recognition apparatus 110 configured to or programmed to receive the input speech 120 from the user and to convert the input speech 120 to the text 140. The speech recognition apparatus 110 may recognize an input speech and generate text data corresponding to the speech input. The speech recognition apparatus 110 may be implemented on a hardware module that is configured to convert words included in a speech input to a text.

In an example, the speech recognition apparatus 110 may be embedded in a mobile phone, a cellular phone, a personal computer (PC), a laptop computer, a netbook, a tablet PC, a personal digital assistant (PDA), a digital camera, a game console, an MP3 player, a personal multimedia player (PMP), an e-book, a navigation system, a disk player, a set-top box, a home appliance, a communication device, a display device, or other electronic devices that are configured to interact with the speech recognition apparatus 110. In an example, the speech recognition apparatus 110 may be embedded in a smart watch, a smart home appliance, an intelligent vehicle, an autonomous driving vehicle or device, a smart home environment, a smart building environment, a smart office environment, a smart electronic security system or other smart devices that are configured to interact with the speech recognition apparatus 110. In addition, the speech recognition apparatus 110 may be included in a wearable device worn on a body of a user, or may be configured to interact with the wearable device. The wearable device may be provided in a form of, for example, ring, watch, eyeglasses, bracelet, belt, band, necklace, earring, helmet, and clothes.

The speech recognition apparatus 110 uses a language model stored in a language model database (DB) 130 to improve the accuracy of speech recognition. The language model may be a component that is included in a natural language processing engine, and is used to provide a result of recognizing a speech that is input in a natural language. In an example, the language model may provides a probability value associated with each of a subword, a word, a phrase, and/or a sentence, and the speech recognition apparatus 110 determines a result of speech recognition based on text expressions provided by the language model and probability values of the text expressions. For speech recognition, a single language model or a set of language models may be used. A language model that is used for speech recognition may be, for example, a general language model that is independent from a domain of an speech input, a language model trained with a corpus including speech expressions mainly used in different domains, and a personalized language model (PLM) which is personalized based on user information or information stored in a user terminal such as a smartphone, for example, contact information.

A type of speech of a user, a word included in a speech that is input, or a speech pattern may vary based on a situation or a domain in which speech recognition is performed. For example, when speech recognition is used in a television (TV), a speech input may include a speech mainly associated with a function of the TV, for example, a program search, a channel selection, and a volume control. For another example, when speech recognition is used in a smartphone, a speech input may include a speech mainly associated with a function of the smartphone. In this example, a word included in the speech input or a speech pattern may vary based on, for example, whether a user is to use a short message service (SMS) in the smartphone through speech recognition, search for a location of a restaurant from a map, or make a call to a friend of the user. Thus, by using a desirable language model suitable for a domain or situation in which speech recognition is performed, a performance of the speech recognition may be improved.

In another example, when speech recognition is performed based on various domains associated with a speech of a user, as when a smartphone or a smart home in which various home appliances need to be integrally managed, an influence of a language model may need to be adjusted based on a type of the speech. In an example, when the user calls a friend on the smartphone through speech recognition, it may be desirable to increase an influence of a PLM to distinguish a name of the friend from a speech input from the user. In this example, when the user is to execute an application in the smartphone through speech recognition, it may be desirable to increase an influence of a language model associated with the smartphone on determining a result of the speech recognition.

Examples described herein provides a more accurate result of speech recognition by dynamically determining a weight to be applied to an output of at least one language model based on a situation or a domain in which the speech recognition is performed. For example, the speech recognition apparatus 110 may classify a domain of a speech input based on the speech input, adjust a combination weight to be applied to an output of a language model based on the domain obtained through the classification, and thus effectively adjust an influence of the language model on a result of the speech recognition based on the domain of the speech input.

Figure 2:
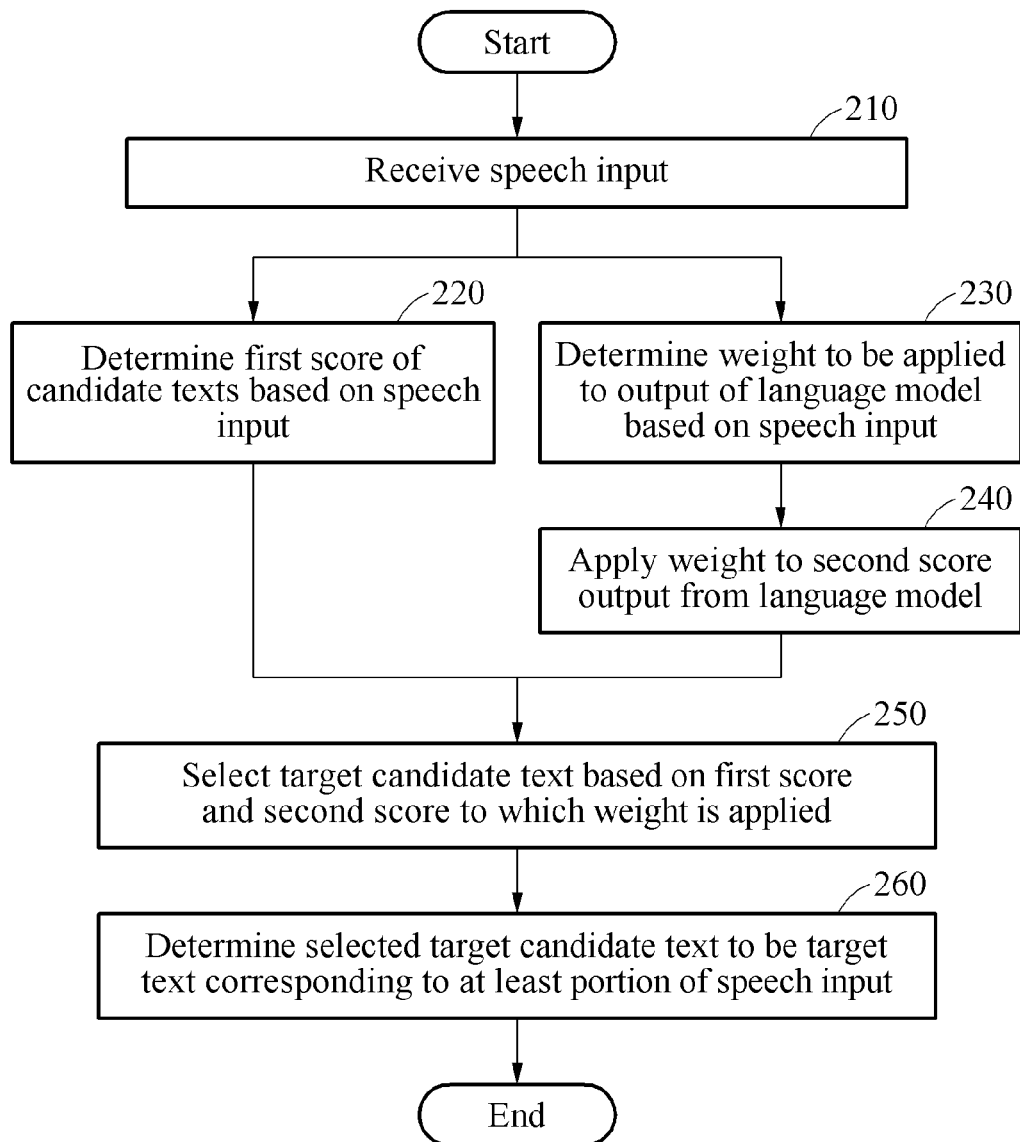
FIG. 2 is a diagram illustrating an example of a speech recognition method.

FIG. 2 is a diagram illustrating an example of a speech recognition method. The speech recognition method to be described hereinafter may be performed by a speech recognition apparatus described herein. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer, such as a processor, that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

Referring to FIG. 2, in operation 210, a speech recognition apparatus receives a speech input. A user may input a speech through a voice interface such as a microphone to give a vocal command, and a speech signal of the input speech may be transmitted to the speech recognition apparatus.

In operation 220, the speech recognition apparatus determines a first score of candidate texts based on the speech input. For example, the speech recognition apparatus may determine a first score indicating whether a portion of the speech that is input, which is a current target to be analyzed, corresponds to a candidate text "call," and a first score indicating whether the portion of the speech input corresponds to a candidate text "send." The speech recognition apparatus may also determine first scores corresponding respectively to other candidate texts in addition to the candidate texts "call" and "send." The candidate texts may include various subwords, words, phrases, and/or sentences, and the first score may indicate a probability value or an expected value of each of the candidate texts. For example, that the first score of the candidate text "call" is 0.75 may indicate that a probability of the portion of the speech that is input, which is the target to be currently recognized, corresponding to the candidate text "call" is 0.75 when represented as a relative value.

In one example, the speech recognition apparatus may determine the first score of the candidate texts using a neural network-based encoder-decoder language recognition model. The speech recognition apparatus may extract a feature value, for example, a feature vector, from the speech input using an encoder, and determine the first score of each of the candidate texts from the extracted feature value using a decoder. In this example, the encoder is configured to convert a speech input to an abstract feature vector, and the decoder is configured to determine a probability value or an expected value of a candidate text based on the feature vector.

An encoder-decoder based speech recognition model will be primarily described hereinafter for convenience of description. However, examples are not limited to using the encoder-decoder based speech recognition model. For example, a language recognition model including an acoustic model and a basic language model may be used to determine a first score of candidate texts. In this example, the acoustic model is configured to output a result of recognizing a speech input by a phoneme unit based on a feature extracted from the speech input. The basic language model is configured to provide, as the first score, probability information based on a relationship between words based on a result of the recognizing performed by a phoneme unit.

In operation 230, the speech recognition apparatus determines a weight to be applied to an output of the language model based on the speech input. In an example, the speech recognition apparatus extracts a feature value from the speech input and determines the weight based on the extracted feature value. In an example, the weight is used to adjust an influence of the output of the language model on a result of speech recognition. For example, the greater a weight to be applied to an output of a language model L, the greater an importance or a dependency of the language model L.

According to an example, a number of language models are used for speech recognition, and the speech recognition apparatus determines a weight that is to be applied to each of the language models. In an example, when the language model includes a first language model configured to output a second score of the candidate texts and a second language model configured to output a third score of the candidate texts, the speech recognition apparatus may determine a first weight that is to be applied to the second score and a second weight that is to be applied to the third score. In another example, the speech recognition apparatus may select at least one language model to which a weight is applied from the language models, and determine the weight to be applied to an output of the selected language model. A language model needed for speech recognition may be selectively used from among a many language models, thus, improving the efficiency.

In one example, the speech recognition apparatus may determine the weight using a neural network-based weight determiner configured to use, as an input, a feature value output from an encoder of a neural network-based encoder-decoder language recognition model, and output a weight corresponding to the feature value. In an example, the weight determiner receives at least one of an output of the encoder, an output of the decoder at a previous time (e.g., a result of speech recognition at the previous time), or context information, and then provides a weight to be applied to each of the language models. In an example, the weight determiner may output, as the weight, a vector value indicating a probability that is to be applied to each language model, and the output vector value may be used as a combination weight to determine a proportion or ratio of each language model at which each language model is to be reflected or considered.

In one example, the speech recognition apparatus may determine a weight to be applied to an output of a language model at a current time based on the speech input and a target text determined at a previous time. In this example, an output of the encoder and information associated with the target text determined at the previous time may be input to the weight determiner. In an example, the target text determined at the previous time may include at least one target text determined from a time at which speech recognition is initiated to a time immediately before the current time. A target text indicates a text that is finally determined to correspond to a portion of the speech input.

In another example, the speech recognition apparatus may determine a weight to be applied to an output of a language model based on the speech input and context information. In an example, the context information is separate from an output of the encoder and is input to the weight determiner. The context information may include all sets of information associated with the speech input of the user. For example, the context information may include any one or any combination of information of the user inputting the speech, such as, for example, a gender, an age, a nationality, an address, an occupation, and an office the user, time information, location information, language information, speech recognition history information, or information on a currently operating application program on the device.

In another example, the speech recognition apparatus may determine a weight to be applied to an output of a language model at a current time based on the speech input, a target text determined at a previous time, and context information. In this example, an output of the encoder, information on the target text determined at the previous time, and the context information may be input to the weight determiner.

In an example, the weight determiner is trained in advance using training data having, as an output value, a label corresponding to the speech input of the user. During the training, the weight determiner may be trained to receive, as an input, an output of the encoder or both an output of the encoder and an output of the decoder, and predict a label corresponding to the input. However, when there is no label to be predicted, the weight determiner may be trained to improve a performance score of a speech recognition model, for example, a word error rate (WER) and a bilingual evaluation understudy (BLEU).

In operation 240, the speech recognition apparatus applies the weight determined in operation 230 to a second score of candidate texts output from the language model. The candidate texts may be one of a subword, a word, a phrase, and a sentence. The second score indicates, similarly to the first score, a probability value or an expected value corresponding to each of the candidate texts. For example, in a case in which the language model includes a plurality of language models, the language models may provide same candidate texts. According to an example, the language models may provide different candidate texts. Each of the language models may output a score, for example, a second score and a third score, of each of the candidate texts to determine a next target text subsequent to a target text determined at a previous time, based on the target text determined at the previous time. The speech recognition apparatus may then apply a weight corresponding to each of the language models to a score of each of candidate texts output from each of the language models. For example, the weight determined in operation 230 may be multiplied by a score of each of the candidate texts output from the language model.

In operation 250, the speech recognition apparatus selects a target candidate text from the candidate texts based on the first score determined in operation 220 and the second score to which the weight is applied in operation 240. For example, the speech recognition apparatus may select, as the target candidate text from the candidate texts, a candidate text having a greatest sum of the first score and the second score to which the weight is applied. As described above, the speech recognition apparatus may select a target candidate text based on a result of combining the scores.

In one example, the language model may include a first language model configured to output a second score of candidate texts, and a second language model configured to output a third score of the candidate texts. The first language model and the second language model may individually determine a score for a same candidate text set. In this example, when a first weight and a second weight respectively corresponding to the second score and the third score are determined, the speech recognition apparatus may select the target candidate text from the candidate texts based on the first score determined in operation 220, the second score to which the first weight is applied, and the third score to which the second weight is applied.

In operation 260, the speech recognition apparatus determines the target candidate text selected in operation 250 to be a target text corresponding to a portion of the speech input. In an example, the speech recognition apparatus may repetitively perform operations 220 through 260 to sequentially determine target texts respectively corresponding to a portion of the speech input, and determine a text corresponding to an entirety of the speech input by combining the determined target texts.

As described above, the speech recognition apparatus may select a desirable language model suitable for a type of speech uttered by a user that may vary depending on a situation, or desirably adjust an influence of each language model, by dynamically adjusting a weight to be applied to an output of a language model based on a speech input, and may thus improve an accuracy of a result of speech recognition. Thus, the speech recognition apparatus may be effectively used for natural language processing that needs to be performed in a domain in which various applications are executed, for example, a smartphone and a smart home.

Figure 3:
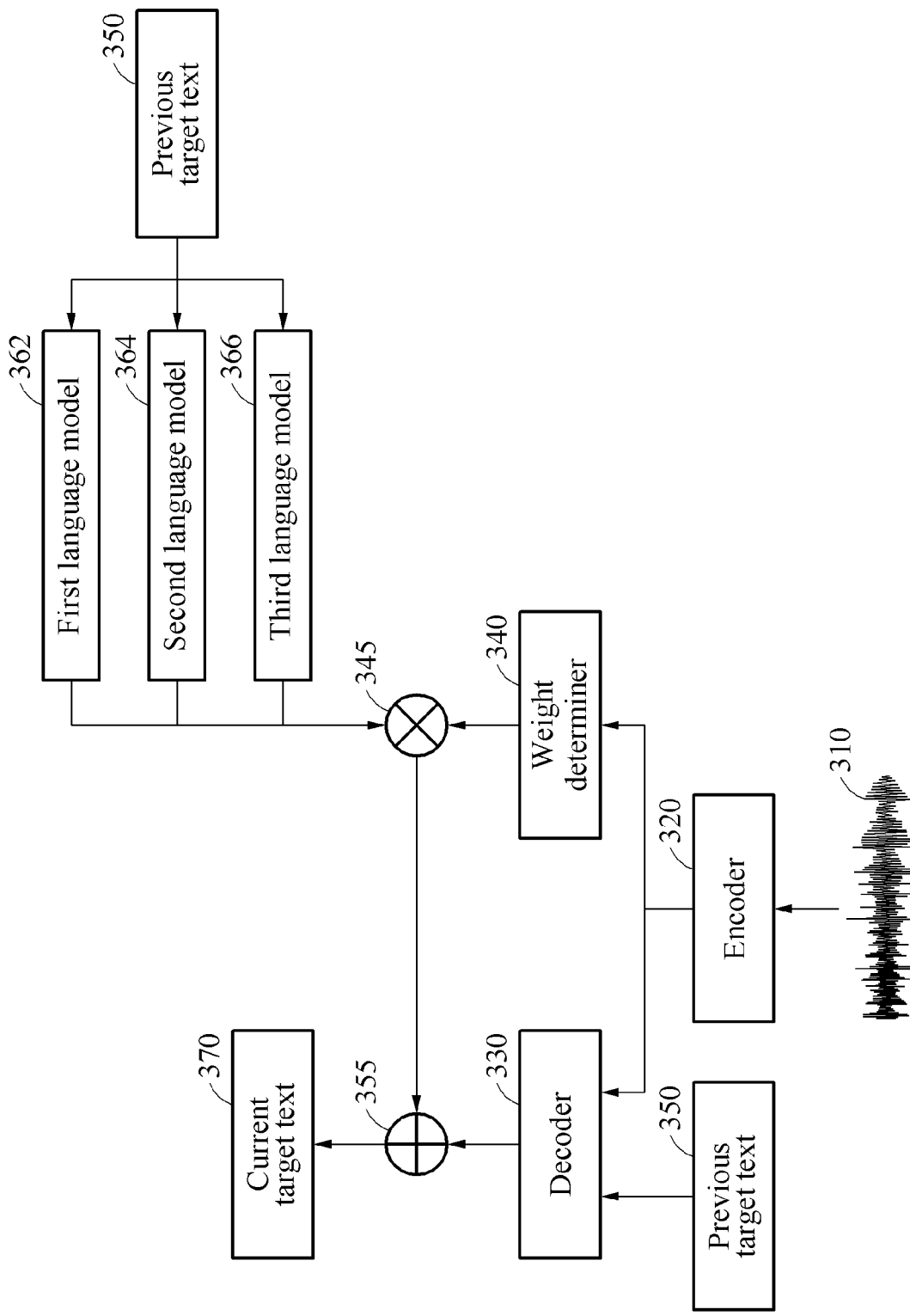
FIGS. 3, 4, and 5 are diagrams illustrating examples of performing speech recognition.

FIG. 3 is a diagram illustrating an example of how a weight is determined based on an output of an encoder. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer, such as a processor, that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

Referring to FIG. 3, a neural network-based encoder-decoder language recognition model may be used as a language recognition model. The encoder-decoder language recognition model may sequentially estimate words included in an entire text corresponding to a input speech 310 through various decoding processes. As illustrated, the input speech 310 is input to an encoder 320. An abstract feature value, for example, a feature vector, of the input speech 310 is output from the encoder 320, and the feature value is input to a decoder 330 and a neural network-based weight determiner 340.

In an example, the neural network-based encoder 320, decoder 330 and a neural network-based weight determiner 340 may be configured as a single network and may also be configured as a recurrent network. In an example, the neural network-based encoder 320, decoder 330 and a neural network-based weight determiner 340 may be a deep neural network (DNN). The DNN may include a fully-connected network (FCN), a deep convolutional network (DCN), a recurrent neural network (RNN), a long-short term memory (LSTM) network, and a grated recurrent units (GRUs).

In an example, the neural network-based encoder 320, the neural network-based decoder 330, and the neural network-based weight determiner 340 may be implemented as an architecture having a plurality of layers including an input, feature maps, and an output. In the neural network, a convolution operation between the input image, and a filter referred to as a kernel, is performed, and as a result of the convolution operation, the feature maps are output. Here, the feature maps that are output are input feature maps, and a convolution operation between the output feature maps and the kernel is performed again, and as a result, new feature maps are output. Based on such repeatedly performed convolution operations, results of recognition of characteristics of the input image via the neural network may be output.

In an example, the neural network may receive an input source sentence, e.g., voice entry. A convolution operation is performed on the input source sentence, input word, input phrase, or input sub-sentence with a kernel, and as a result, the feature maps are output. The convolution operation is performed again on the output feature maps as input feature maps, with a kernel, and new feature maps are output. When the convolution operation is repeatedly performed as such, a recognition result with respect to features of the input source sentence may be finally output through the neural network.

The neural network-based encoder 320, the neural network-based decoder 330, and the neural network-based weight determiner 340 may map input data and output data that have a nonlinear relationship based on deep learning to perform tasks such as, for example, voice recognition, feature extraction, and weight determination. The deep learning may be a type of machine learning that is applied to perform speech recognition from a big dataset. The deep learning may be performed in supervised and/or unsupervised manners, which may be applied to perform the mapping of input data and output data.

The decoder 330 determines first scores of candidate texts based on the feature value received from the encoder 320 and a previous target text 350 determined at a previous time. For example, when the previous target text 350 is not present because speech recognition is in its initial stage, the decoder 330 may determine the first scores of the candidate texts only using the feature value received from the encoder 320 without the previous target text 350.

The encoder 320 and the decoder 330 may be trained in advance based on training data including an audio signal and a text corresponding to the audio signal. When an utterance or expression has not been encountered in the training process, one or more of the language models, for example, a first language model 362, a second language model 364, and a third language model 366 as illustrated, may be used to compensate for such an utterance or expression in a speech recognition process. The speech recognition apparatus uses a plurality of language models, for example, the language models 362, 364, and 366, to recognize a speech uttered by a user in various domains. The language models 362, 364, and 366 may be based on, for example, a neural network, an N-gram, or a word/character string list, and provide various utterances or speeches as the speech input 310.

In the example of the encoder-decoder language recognition model, the decoder 330 may function as the language model. However, to further improve a performance in speech recognition, at least one language model, for example, the language models 362, 364, and 366, may be used as an external language model. In an example, the language model may include a language model specific to a certain domain. For example, in a case in which the language recognition model is used for speech recognition in a TV, the language model may include a language model configured to provide candidate texts associated with execution of functions of the TV. Thus, in an example, the language model may be specialized for a syntax of a type of device.

For example, when the language model includes the first language model 362, the second language model 364, and the third language model 366, each of the first language model 362, the second language model 364, and the third language model 366 may provide candidate texts to be used to determine a next target text subsequent to the previous target text 350, and a second score, a third score, and a fourth score corresponding to the candidate texts, based on the previous target text 350. For example, in a case in which "everybody" is determined to be the previous target text 350, the first language model 362 may provide candidate texts, for example, "need to," "meta," and "neat," which may be likely to follow "everybody," and provide, as the second score, a probability of each of the candidate texts "need to," "meta," and "neat" being subsequent to "everybody." In this example, the second language model 364 may also provide, as the third score, a probability of each of the candidate texts "need to," "meta," and "neat" being subsequent to "everybody." The third language model 366 may also perform functions, similarly to the first language model 362 and the second language model 364. In an example, the second, third, and fourth scores provided by the language models 362, 364, and 366 may be applied in each decoding step of the decoder 330 based on an on-the-fly rescoring method.

The weight determiner 340 determines a weight to be applied to an output of the language models 362, 364, and 366 based on the output of the encoder 320, for example, the feature vector. The weight determiner 340 may be a neural network trained to output a weight to be applied to an output of each of the language models 362, 364, and 366 based on input data. For example, the weight determiner 340 may determine a first weight to be applied to the second score output from the first language model 362, a second weight to be applied to the third score output from the second language model 364, and a third weight to be applied to the fourth score output from the third language model 366. The first weight, the second weight, and the third weight may function as a combination weight for the outputs of the language models 362, 364, and 366. In an example, the first, second, and third weights may be determined by the weight determiner 340, and then be maintained as the same values in each decoding step.

In another example, the weight determiner 340 may select at least one language model to which a weight is to be applied from the language models 362, 364, and 366 based on the output of the encoder 320, and determine the weight to be applied to the selected language model. In this example, a language model suitable for speech recognition for a type of the speech input 310 may be selected, and thus an accuracy of a result of the speech recognition may be improved. According to an example, the weight determiner 340 may determine the weight only for the selected language model or set, to be 0, a weight to be applied to a language model that is not selected.

Based on the output of the encoder 320, information derived from the speech input 310 may be used for the weight determiner 340 to determine a weight, thereby enabling more accurate speech recognition. For example, contributions of the language models 362, 364, and 366 in a result of speech recognition may vary based on a weight that is determined by the weight determiner 340, thereby enabling speech recognition optimized for a type of the speech input 310. In this example, a weight to be applied to the language models 362, 364, and 366 may be adjusted such that an output of a language model associated with a type of the speech input 310 is more applied to the result of the speech recognition. A type of the speech input 310 may be variously defined. For example, the type may be an environment in which the speech recognition is performed, such as, for example, TV, refrigerator, smartphone, and smart home devices. In another example, the type may be a type of an utterance or speech for which speech recognition is performed in a smartphone, such as, for example, phone call, message transmission, application execution, and search. In another example, the type may be a type of a word included in the speech that is input 310, such as, for example, a human name, address, and word in a certain category such as a restaurant and a hotel. Thus, the weight for each of the language models 362, 364, and 366 may be dynamically varied based on a type of input speech.

In stage 345, the speech recognition apparatus applies the weight determined by the weight determiner 340 to an output of the language models 362, 364, and 366. For example, as illustrated, the speech recognition apparatus multiples the second score output from the first language model 362 by the first weight, the third score output from the second language model 364 by the second weight, and the fourth score output from the third language model 366 by the third weight.

The speech recognition apparatus selects a target candidate text from the candidate texts. For example, as illustrated, the speech recognition apparatus calculates a sum of the first score, the second score multiplied by the first weight, the third score multiplied by the second weight, and the fourth score multiplied by the third weight in stage 355, and selects a candidate text having a greatest sum among the candidate texts as the target candidate text. For example, the speech recognition apparatus may determine a final score for each of the candidate texts based on Equation 1.

$$p(s)=De(s)+w_a \times LM_a(S)+w_b \times LM_b(S)+w_c \times LM_c(S)$$ [Equation 1]

In Equation 1, p(s) denotes a final score of a candidate text s, and De(s) denotes a first score of the candidate text s output from the decoder 330. $LM_b(s)$, $LM_b(s)$, and $LM_c(s)$ denote a second score of the first language model 362 for the candidate text s, a third score of the second language model 364 for the candidate text s, and a fourth score of the third language model 366 for the candidate text s, respectively. In addition, $w_a$, $w_b$, and $w_c$ denotes a first weight, a second weight, and a third weight, respectively, that are determined by the weight determiner 340. In Equation 1, values of $w_a$, $w_b$, and $w_c$ may be adjusted based on factors such as, for example, a type of the speech input 310, an environment in which the speech input 310 is made, and a type of device in which speech recognition is performed. For example, a weight to be applied to a language model that is more associated with the type of the speech input 310 may be set to be higher than a weight to be applied to other language models that are less associated with the type of the speech input 310. Based on Equation 1 above, the speech recognition apparatus selects a candidate text having a greatest value of p(s) as the target candidate text from the candidate texts.

The speech recognition apparatus determines the selected target candidate text to be a final current target text 370 in a current decoding step. In each decoding step, a single word or a subword may be determined to be the current target text 370.

Figure 4:
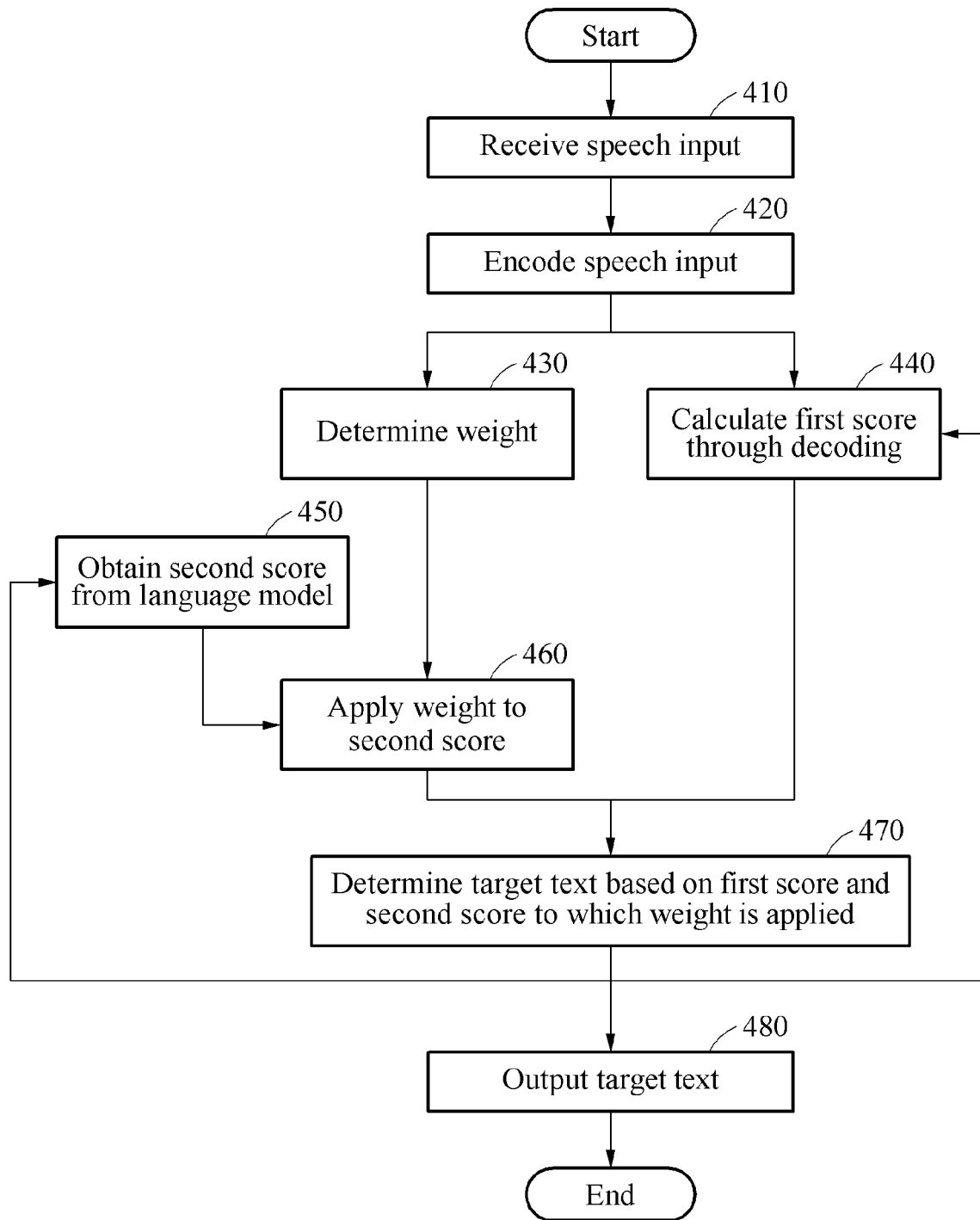

FIG. 4 is a diagram illustrating an example of determining a weight based on an output of an encoder. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer, such as a processor, that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

Referring to FIG. 4, in operation 410, the speech recognition apparatus receives a speech that is input. In operation 420, the speech recognition apparatus encodes the input speech using the encoder 320 to extract an abstract feature value of the input speech. In operation 440, the speech recognition apparatus calculates a first score of candidate texts by decoding the encoded speech input using the decoder 330.

In operation 430, the speech recognition apparatus determines a weight to be applied to an output of a language model using the weight determiner 340 using, as an input, an output of the encoder 320. The language model may include one or more language models, and the weight determiner 340 may determine a weight to be applied to an output of each language model. In operation 450, the speech recognition apparatus obtains a second score of each of the candidate texts from the language model. The language model may provide the second score corresponding to each of the candidate texts to determine a current target text subsequent to a previous target text based on the previous target text determined at a previous time.

In operation 460, the speech recognition apparatus applies the weight determined in operation 430 to the second score of the candidate texts. In operation 470, the speech recognition apparatus selects a target candidate text from the candidate texts based on the first score determined in operation 440 and the second score to which the weight is applied in operation 460, and determines the selected target candidate text to be a target text at a current time. For example, the speech recognition apparatus may calculate a sum of the first score and the second score to which the weight is applied for each of the candidate texts and determine, to be the target candidate text, a candidate text having a greatest sum. In operation 480, the speech recognition apparatus outputs the target text determined in operation 470. The target text determined in operation 470 may be used as an input to the language model and the decoder 330 in a next decoding step, and operations 440, 450, 460, 470, and 480 may be repetitively performed to determine a next target text.

Figure 5:
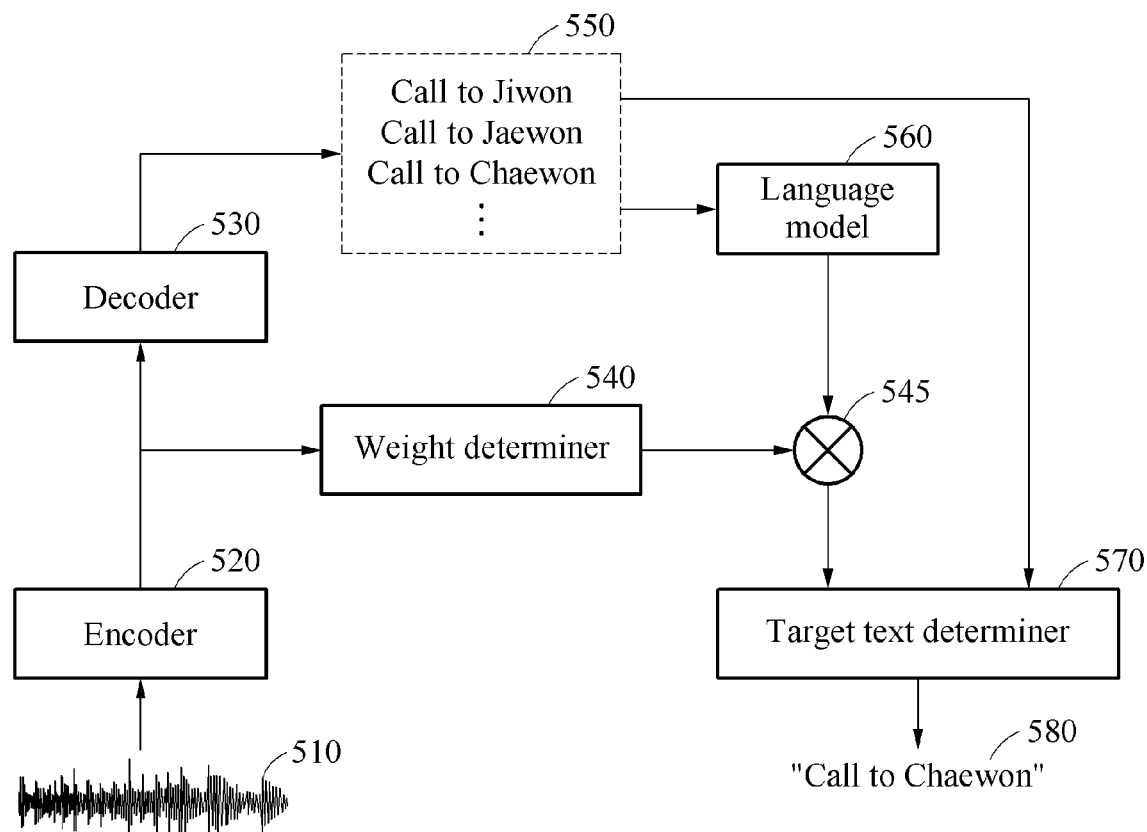

FIG. 5 is a diagram illustrating an example of performing speech recognition using an n-best rescoring method and a speech recognition apparatus.

Referring to FIG. 5, an encoder 520 extracts an abstract feature value from an input speech 510. A decoder 530 performs decoding based on the feature value output from the encoder 520, and outputs candidate word sequences 550 corresponding to the speech input 510. For example, when the decoding is completed, the decoder 530 outputs n candidate word sequences 550 in order of first score, for example, probability, starting from a sequence having a greatest first score.

A language model 560 provides the candidate word sequences 550 and a second score corresponding to each of the candidate word sequences 550 based on an output of the decoder 530. The language model 560 may include a single language model or a plurality of language models. For example, in a case of the language model 560 including more than one language model, each of the language models may provide a score corresponding to each of the candidate word sequences 550.

A neural network-based weight determiner 540 determines a weight to be applied to an output of the language model 560 based on an output of the encoder 520. For example, when the language model 560 includes more than one language model, the weight determiner 540 may determine a weight to be applied to an output of each of the language models. The speech recognition apparatus applies the weight determined by the weight determiner 540 to the second score output from the language model 560 in stage 545. For example, a second score corresponding to the candidate word sequences 550 may be multiplied by the weight.

A target text determiner 570 selects a target word sequence from the candidate word sequences 550 based on the first score of the candidate word sequences 550 output from the decoder 530 and the second score to which the weight of the candidate word sequences 550 is applied. For example, the target text determiner 570 may select, as the target word sequence from the candidate word sequences 550, a word sequence having a greatest final score among the candidate word sequences 550. The target text determiner 570 then outputs the selected target word sequence as a target text 580.

Figure 6:
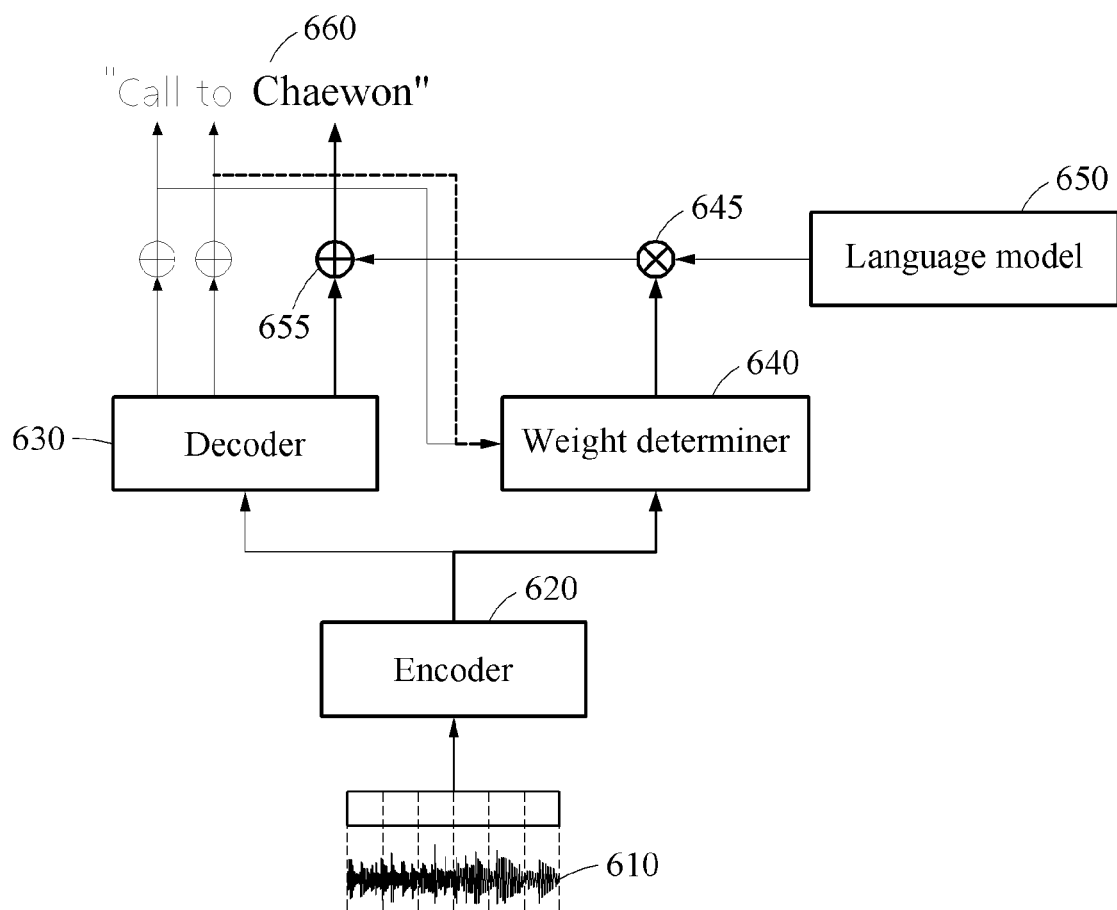
FIGS. 6 and 7 are diagrams illustrating examples of performing speech recognition.

FIG. 6 is a diagram illustrating an example of determining a weight based on an output of an encoder and a previous target text. In addition to the description of FIG. 6 below, the descriptions of FIG. 3 are also applicable to FIG. 6, and are incorporated herein by reference. Thus, the above description may not be repeated here.

In a process of recognizing a single speech input, for example, a speech input 610, a weight for each language model may need to be applied differently based on a text included in the speech input 610. For example, when a speech signal corresponding to the speech input 610, for example, "call to Chaewon," is input to a smartphone for speech recognition, a front portion "call to" of the speech input 610 may be an utterance or speech that is mainly input for the speech recognition in the smartphone, and may thus be recognized using a language model associated with a domain of the smartphone or a general language model. However, a back portion "Chaewon" of the speech input 610 may be a name of a message sender, thus, increasing a proportion of a language model associated with a domain of contact information stored in the smartphone may be desirable to distinguish the name from similarly pronounced names, for example, "Jaewon," "Chawon," and "Cheon," for more accurate speech recognition.

Referring to FIG. 6, a decoder 630 determines first scores of candidate texts based on a feature value output from an encoder 620 and a previous target text determined at a previous time. A weight determiner 640 determines a weight to be applied to an output of a language model 650 based on a result of speech recognition from a previous decoding step, in addition to the speech input 610 which is a speech uttered by a user in each decoding step. For example, the weight determiner 640 may determine a first weight to be applied to a second score output from the language model 650 based on the previous target text and an output of the encoder 620. In this example, at least one of one or more target texts determined until a current time may be input to the weight determiner 640.

In one example, the weight determiner 640 determines a weight to be applied to an output of the language model 650 in each decoding step. The weight determiner 640 receives an output of the encoder 620 and a previously output target text and determines a weight at a current time, in each decoding step. In this example, $w_a$, $w_b$, and $w_c$ in Equation 1 above may vary in each decoding step. For example, $w_a$ determined at a previous time and $w_a$ determined at a current time may differ from each other.

In the example described above, the weight determiner 640 may set a weight to be applied to an output of the language model associated with the domain of the smartphone to be high until a point in time at which the front portion "call to" is output in the example speech signal described above. At a subsequent time the weight determiner 640 may determine a weight based on a previous target text, for example, "call to," and thus, the weight determiner 640 may determine that a probability of a human name on a contact list of the smartphone following the previous target text "call to" is high. Thus, the weight determiner 640 may set a weight to be applied to an output of the language model associated with the domain of the contact information to be high.

The speech recognition apparatus applies the weight determined in each decoding step to an output of the language model 650 in stage 645 and selects a current target text 660 from candidate texts based on a result of applying the weight. The weight to be applied to the second score may vary in each decoding step. For example, as illustrated, the speech recognition apparatus multiplies a second score corresponding to each of the candidate texts by a weight determined by the weight determiner 640. The speech recognition apparatus calculates a sum of a first score and the second score to which the weight is applied for each of the candidate texts in stage 655, and determines the target text 660, for example, "Chaewon," at a current time from among the candidate texts based on a result of the calculating of the sum. For example, the speech recognition apparatus may determine, to be the target text 660, a candidate text having a greatest sum among the candidate texts.

Figure 7:
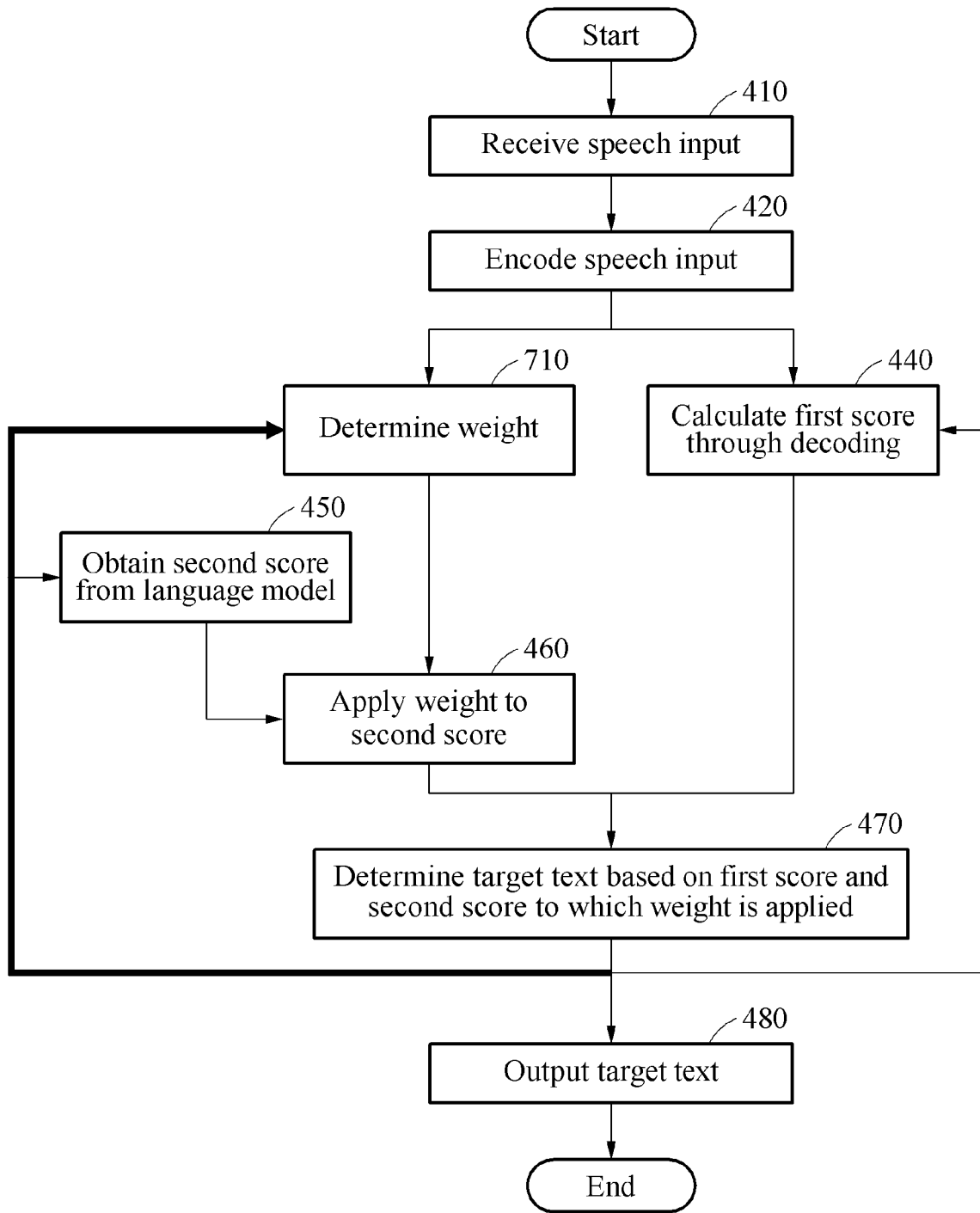

FIG. 7 is a diagram illustrating an example of determining a weight based on an output of an encoder and a previous target text. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer, such as a processor, that perform the specified functions, or combinations of special purpose hardware and computer instructions. In addition to the description of FIG. 7 below, the descriptions of FIGS. 2 and 6 are also applicable to FIG. 7, and are incorporated herein by reference. Thus, the above description may not be repeated here.

Referring to FIG. 7, in operation 710, the speech recognition apparatus determines a weight to be applied to an output of a language model based on an output of the encoder 320 and a previously determined target text. The speech recognition apparatus determines the weight based on at least one of target texts previously determined in each decoding step. In operation 460, the speech recognition apparatus applies the weight determined in operation 710 to a second score obtained from the language model. In operation 470, the speech recognition apparatus selects a target candidate text from candidate texts based on a first score determined in operation 440 and the second score to which the weight is applied in operation 460, and determines the selected target candidate text to be a target text at a current time. In operation 710, the determined target text may be used to determine a weight at a subsequent time. In operation 480, the speech recognition apparatus outputs the target text determined at the current time, and repetitively performs operations 440, 450, 460, 470, 480, and 710.

Figure 8:
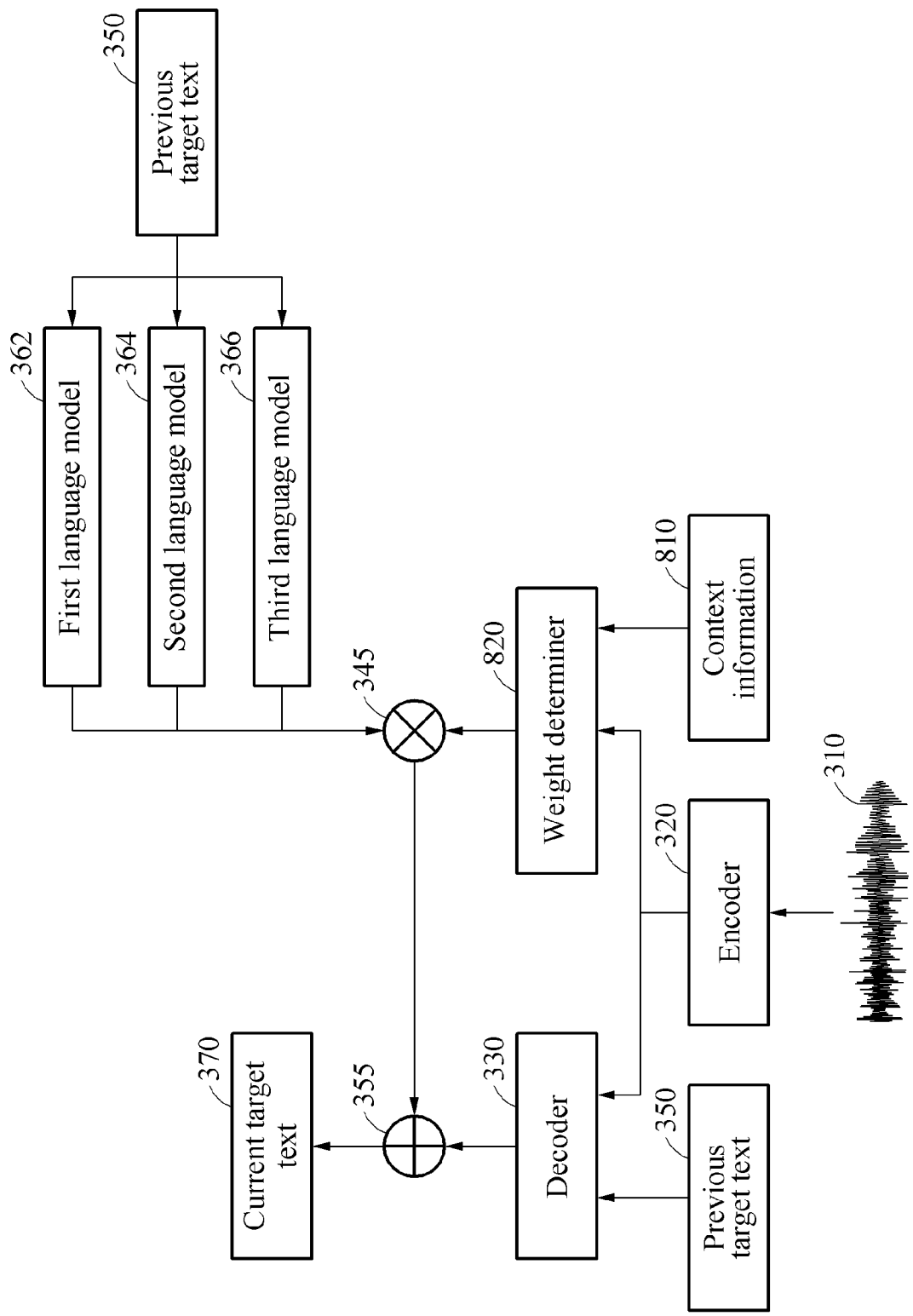
FIGS. 8 and 9 are diagrams illustrating examples of performing speech recognition.

FIG. 8 is a diagram illustrating an example of determining a weight based on an output of an encoder and context information. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer, such as a processor, that perform the specified functions, or combinations of special purpose hardware and computer instructions. In addition to the description of FIG. 8 below, the descriptions of FIG. 3 are also applicable to FIG. 8, and are incorporated herein by reference. Thus, the above description may not be repeated here.

Referring to FIG. 8, a weight determiner 820 determines a weight to be applied to an output of a language model, for example, the first language model 362, the second language model 364, and the third language model 366, based on the input speech 310 that is uttered by a user along with context information 810. For example, the weight determiner 820 determines a first weight, a second weight, and a third weight to be respectively applied to a second score, a third score, and a fourth score respectively output from the first language model 362, the second language model 364, and the third language model 366 based on an output of the encoder 320 and the context information 810. The context information 810 may include information associated with a situation in which the speech input 310 is made or may be based on user information. For example, the context information 810 may include the user information such as, for example, a gender, an age, a nationality, and an occupation profile of the user, and information associated with a current location, a current time, a currently operating program, a speech recognition history, and a dialog history. The context information 810 may also be used to determine a weight such that speech recognition that is performed is more suitable for the situation in which the input speech 310 is made or for an individual characteristic of the user. The speech recognition apparatus applies the weight determined in each decoding step to the output of the language model, for example, the first language model 362, the second language model 364, and the third language model 366, in stage 345 and selects the current target text 370 from candidate texts based on a result of the applying the weight.

Figure 9:
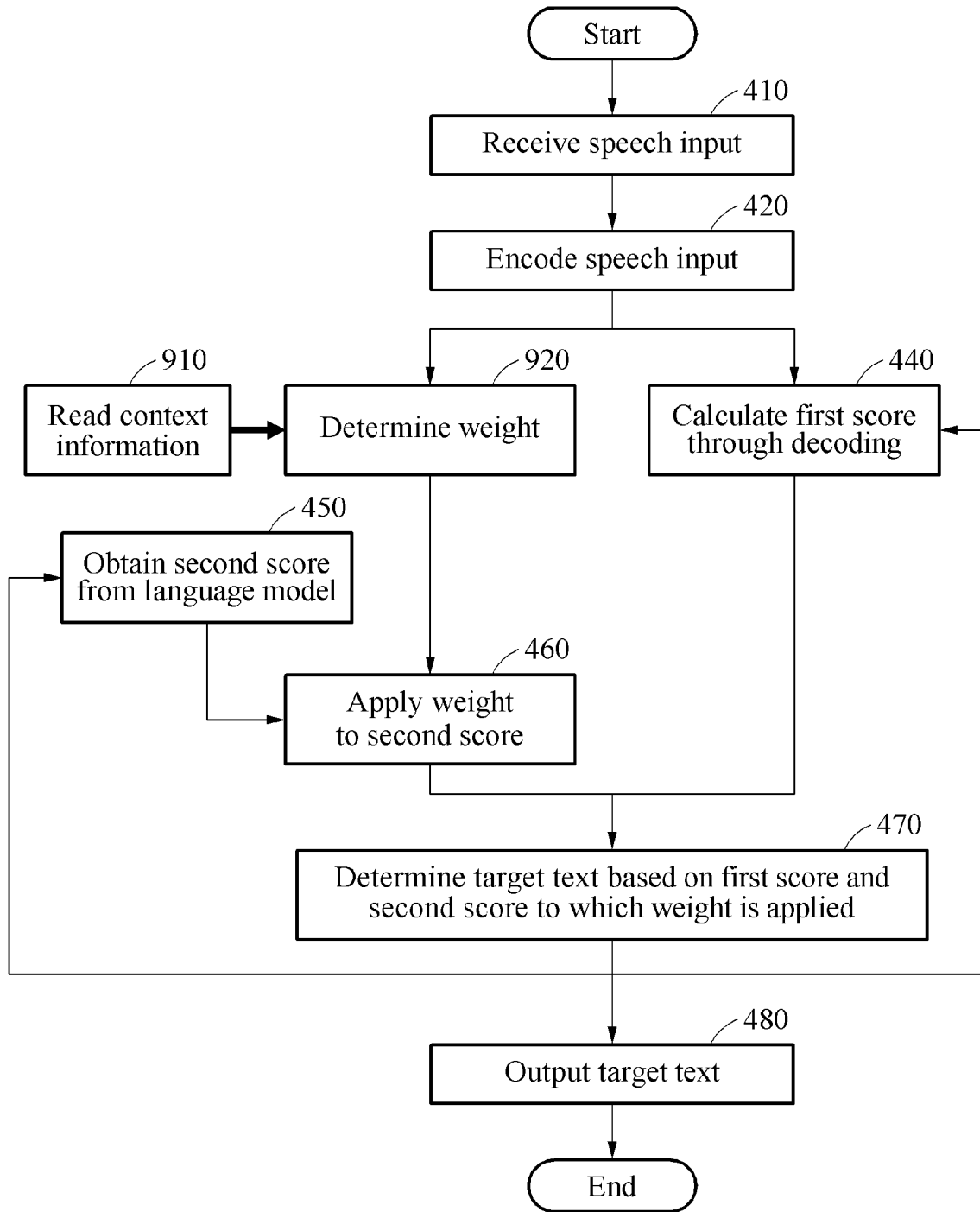

FIG. 9 is a diagram illustrating an example of how a weight is determined based on an output of an encoder and context information. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. One or more blocks of FIG. 9, and combinations of the blocks, can be implemented by special purpose hardware-based computer, such as a processor, that perform the specified functions, or combinations of special purpose hardware and computer instructions. In addition to the description of FIG. 9 below, the descriptions of FIGS. 2 and 8 are also applicable to FIG. 9, and are incorporated herein by reference. Thus, the above description may not be repeated here.

Referring to FIG. 9, in operation 910, the speech recognition apparatus reads context information. In operation 920, the speech recognition apparatus determines a weight to be applied to an output of a language model based on an output of the encoder 320 and the context information. In operation 460, the speech recognition apparatus applies the weight determined in operation 920 to a second score obtained from the language model. In operation 470, the speech recognition apparatus selects a target candidate text from candidate texts based on a first score determined in operation 440 and the second score to which the weight is applied in operation 460, and determines the selected target candidate text to be a target text at a current time. In operation 480, the speech recognition apparatus outputs the target text determined at the current time, and repetitively performs operations 440, 450, 460, 470, 480, and 910.

Figure 10:
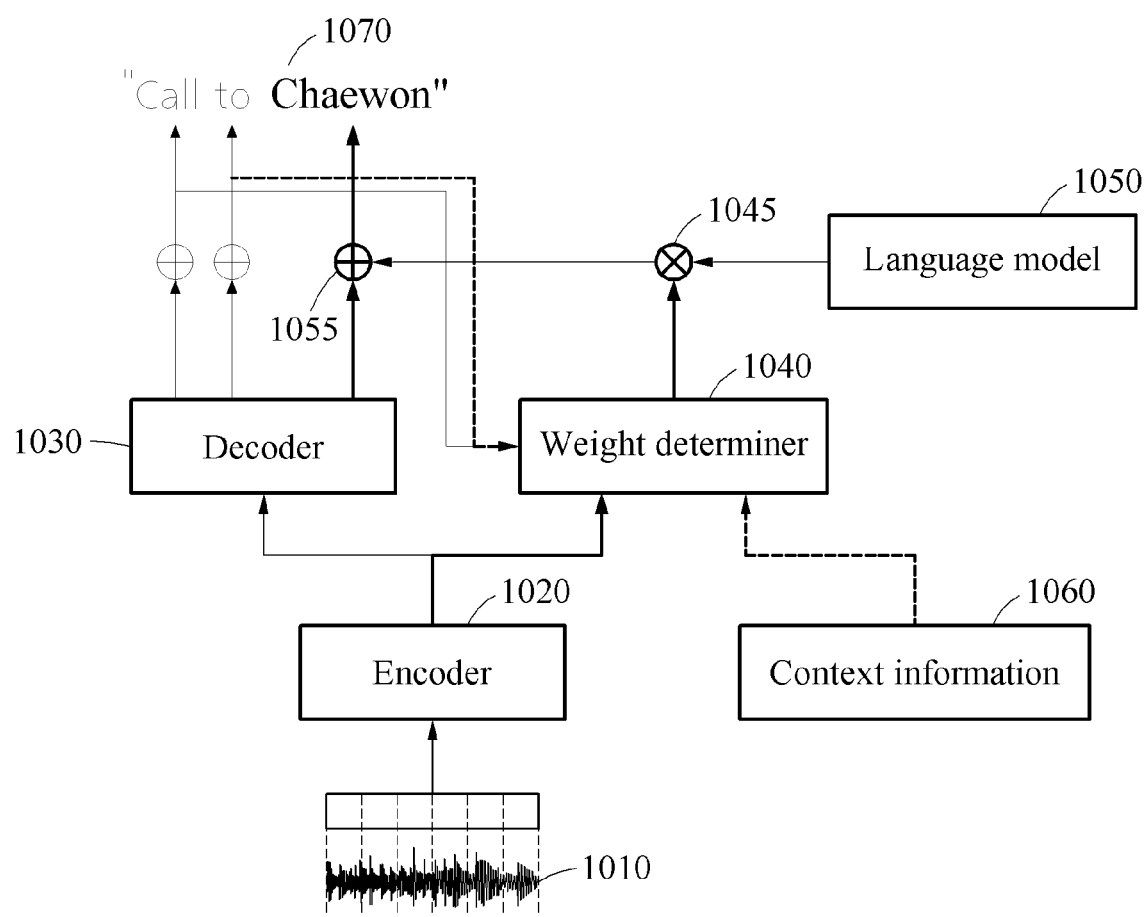
FIG. 10 is a diagram illustrating an example of performing speech recognition.

FIG. 10 is a diagram illustrating an example of determining a weight based on one or more of an output of an encoder, a previous target text, or context information.

Referring to FIG. 10, an encoder 1020 extracts a feature value from a speech that is input 1010. A decoder 1030 determines respective first scores of candidate texts based on the feature value output from the encoder 1020 and a previous target text determined at a previous time. A language model 1050 outputs candidate texts subsequent to the previous target text and a second score corresponding to each of the candidate texts based on the previous target text. A weight determiner 1040 determines a weight to be applied to an output of the language model 1050 based on at least one of the output of the encoder 1020, the previous target text, or context information 1060. In stage 1045, the speech recognition apparatus applies the weight determined by the weight determiner 1040 to the second score output from the language model 1050. For example, the speech recognition apparatus may multiply the second score corresponding to each of the candidate texts by the weight determined by the weight determiner 1040. In stage 1055, the speech recognition apparatus calculates a sum of the first score and the second score to which the weight is applied for each same candidate text, and determines a candidate text having a greatest sum among the candidate texts to be a target text 1070.

Figure 11:
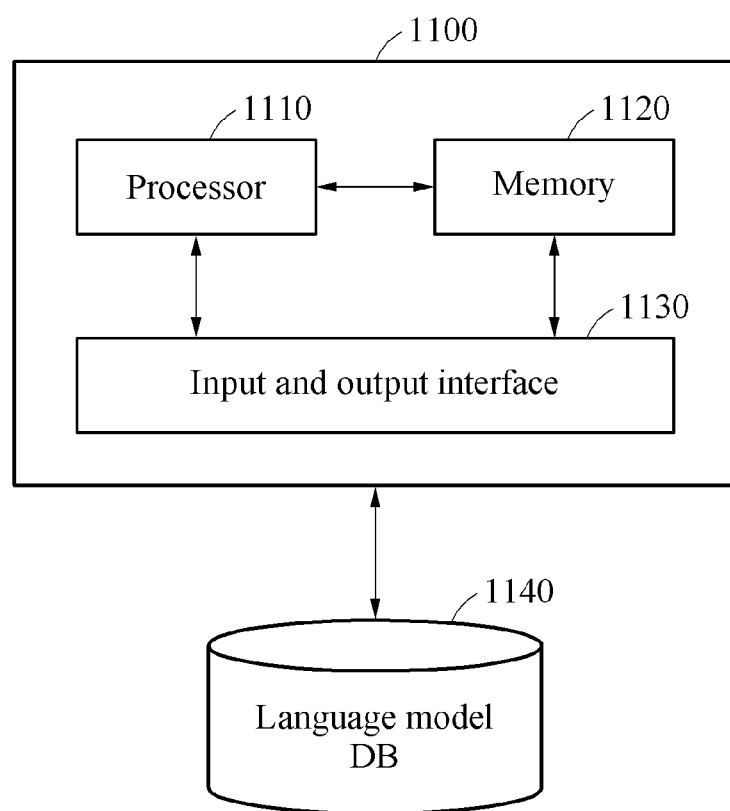
FIG. 11 is a diagram illustrating an example of a speech recognition apparatus.

FIG. 11 is a diagram illustrating an example of a speech recognition apparatus.

Referring to FIG. 11, a speech recognition apparatus 1100 includes a processor 1110, a memory 1120, and an input and output interface 1130. According to an example, the speech recognition apparatus 1100 may further include a language model DB 1140 in which at least one language model is stored.

In an example, the input and output interface 1130 is a physical structure that includes one or more hardware components that provide the ability to render a user interface, render a display, and/or receive user input. The input and output interface 1130 may include a voice interface, for example, a microphone, to receive a speech input. In addition, the input and output interface 1130 may include an input interface such as a keyboard, a touchscreen, and a touchpad, and an output interface such as a display to output a result of speech recognition. However, the input and output interface 1130 is not limited to the example described above, and any other displays, such as, for example, smart phone and eye glass display (EGD) that are operatively connected to the speech recognition apparatus 1100 may be used without departing from the spirit and scope of the illustrative examples described.

The memory 1120 may be connected to the processor 1110, and store instructions executable by the processor 1110, and data to be operated or computed by the processor 1110 or data processed by the processor 1110. In addition, the memory 1120 stores a variety of information generated during the processing at the processor 1110. The memory 1120 may include a non-transitory computer-readable medium, for example, a high-speed random-access memory (RAM), and/or a nonvolatile computer-readable storage medium, for example, at least one disc storage device and flash memory device, and other nonvolatile solid-state storage devices. Further details regarding the memory 1120 is provided below.

The processor 1110 may control an overall operation of the speech recognition apparatus 1100, and execute functions and/or instructions of the speech recognition apparatus 1100. The processor 1110 may perform speech recognition based on the speech input and perform one or more methods or operations described above with reference to FIGS. 1 through 10.

For example, the processor 1110 may determine a first score of candidate texts based on the speech input. The processor 1110 may determine the first score using an encoder-decoder based language recognition model or an acoustic-language model-based language recognition model. The processor 1110 may extract a feature value from the speech input, and determine a weight to be applied to an output of a language model using a neural network-based weight determiner configured to output a weight corresponding to the extracted feature value. The processor 1110 may determine the weight according to various examples described above. For example, the language model may include a plurality of language models. In this example, and the processor 1110 may determine a weight to be applied to each of the language models, or select at least one language model to which a weight is to be applied from the language models add determine a weight to be applied to the selected language model. The language model may be stored in the language model DB 1140.

The processor 1110 may apply the weight to a second score of candidate texts output from the language model. The processor 1110 may select a target candidate text from the candidate texts based on the first score and the second score to which the weight is applied, and determine the selected target candidate text to be a target text corresponding to at least a portion of the speech input. As described above, the processor 1110 may determine a text corresponding to an entirety of the input speech by sequentially determining a target text in sequential order in each decoding step. The processor 1110 may display the text corresponding to an entirety of the input speech on to the display of the input and output interface 1130. Also, the processor 1110 performs at least one method described above with reference to FIGS. 1 to 10 or an algorithm corresponding thereto.

The processor 1110 refers to a data processing device configured as hardware with a circuitry in a physical structure to execute desired operations. For example, the desired operations may include codes or instructions included in a program. For example, the data processing device configured as hardware may include a microprocessor, a central processing unit (CPU), a processor core, a multicore processor, a multiprocessor, an application-specific integrated circuit (ASIC), and a field programmable gate array (FPGA). The processor 1110 executes the program and controls the image recognition model. In an example, the processor 1110 may be a graphics processor unit (GPU), reconfigurable processor, or have any other type of multi- or single-processor configuration. The program code executed by the processor 1110 is stored in the memory 1120. Further details regarding the processor 1110 is provided below.

The processor 1110 refers to a data processing device configured as hardware with a circuitry in a physical structure to execute desired operations. For example, the desired operations may include codes or instructions included in a program. For example, the data processing device configured as hardware may include a microprocessor, a central processing unit (CPU), a processor core, a multicore processor, a multiprocessor, an application-specific integrated circuit (ASIC), and a field programmable gate array (FPGA). The processor 1110 executes the program and controls the image recognition model. In an example, the processor 1110 may be a graphics processor unit (GPU), reconfigurable processor, or have any other type of multi- or single-processor configuration. The program code executed by the processor 1110 is stored in the memory 1120. Further details regarding the processor 1110 is provided below.

The speech recognition device 100, speech recognition apparatus 110, encoder 320, decoder 330, weight determiner 340, encoder 520, decoder 530, weight determiner 540, target text determiner 570, decoder 630, encoder 620, weight determiner 640, weight determiner 820, decoder 1030, encoder 1020, weight determiner 1040, speech recognition apparatus 1100, speech recognition apparatus, and other apparatuses, devices, units, modules, and other components described herein with respect to FIGS. 1, 3, 5, 6, 8, 10, and 11 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of outputting the state information. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A speech recognition method comprising:
determining a first score of candidate texts based on an input speech, wherein the first score of the candidate texts is an output from a neural network-based decoder;
determining a weight for an output of a language model based on the input speech and context information associated with the input speech;
applying the weight to a second score of the candidate texts output from the language model to obtain a weighted second score;
selecting a target candidate text from among the candidate texts based on the first score and the weighted second score corresponding to the target candidate text by determining a candidate text having a greatest sum of the first score and the weighted second score as the target candidate text from among the candidate texts; and
determining the target candidate text to correspond to a portion of the input speech.

2. The speech recognition method of claim 1, wherein the determining of the weight comprises:
determining a weight to be applied to an output of the language model at a current time based on the input speech and a target text determined at a previous time.

3. The speech recognition method of claim 2, wherein the target text determined at the previous time comprises any one or any combination of target texts determined from a time at which speech recognition is initiated to a time immediately before the current time.

4. The speech recognition method of claim 1, wherein the context information comprises any one or any combination of information on a user inputting the input speech, time information, location information, language information, speech recognition history information, and information on a currently operating application program.

5. The speech recognition method of claim 1, wherein the determining of the weight comprises:
determining a weight to be applied to an output of the language model at a current time based on the input speech, a target text determined at a previous time, and the context information.

6. The speech recognition method of claim 1, wherein the determining of the weight comprises:
extracting a feature value from the input speech; and
providing the feature value to a neural network-based weight determiner to determine the weight.

7. The speech recognition method of claim 1, wherein the determining of the first score comprises:
extracting a feature value from the input speech using a neural network-based encoder; and
determining a first score of each of the candidate texts from the extracted feature value using the neural network-based decoder.

8. The speech recognition method of claim 1, wherein the language model comprises a plurality of language models, wherein the determining of the weight comprises:
determining a weight to be applied to an output of each of the plurality of language models.

9. The speech recognition method of claim 8, wherein the plurality of language models comprise a first language model and a second language model,
wherein the first language model is configured to output a second score of the candidate texts, and the second language model is configured to output a third score of the candidate texts,
wherein the determining of the weight comprises:
determining a first weight to be applied to the second score and a second weight to be applied to the third score, and
the selecting of the target candidate text comprises:
selecting the target candidate text based on the first score, the second score to which the first weight is applied, and the third score to which the second weight is applied.

10. The speech recognition method of claim 1, wherein the language model comprises a plurality of language models, and
the determining of the weight comprises:
selecting at least one language model from among the plurality of language models; and
determining a weight to be applied to an output of the selected at least one language model.

11. The speech recognition method of claim 1, wherein the language model is configured to output a second score corresponding to each of the candidate texts to determine, based on a target text determined at a previous time, a next target text subsequent to the target text determined at the previous time.

12. The speech recognition method of claim 1, wherein each of the candidate texts is one of a word, a subword, a phrase, or a sentence.

13. The speech recognition method of claim 1, wherein the determining of the first score comprises:
determining the first score based on the input speech and an output of the neural network-based decoder at a previous time period.

14. The speech recognition method of claim 1, wherein the language model is configured for a syntax of a type of device.

15. The speech recognition method of claim 1, wherein the language model comprises a plurality of language models and a weight for each of the language models is dynamically adjusted based on a type of the input speech.

16. The speech recognition method of claim 15, wherein the type of input speech comprises any one or any combination of a context of the input speech, an environment in which the speech recognition is performed, a type of a word in the input speech, type of device in which the speech recognition is performed, and a type of an utterance for which the speech recognition is performed.

17. A non-transitory computer-readable storage medium storing instructions that, when executed by a processor, cause the processor to perform the speech recognition method of claim 1.

18. A speech recognition apparatus comprising:
a voice interface configured to receive an input speech from a user; and
a processor configured to:
determine a first score of candidate texts based on the input speech, wherein the first score of the candidate texts is an output from a neural network-based decoder;
determine a weight for an output of a language model based on the input speech and context information associated with the input speech;
apply the weight to a second score of the candidate texts output from the language model to obtain a weighted second score;
select a target candidate text from among the candidate texts based on the first score and the weighted second score corresponding to the target candidate text by determining a candidate text having a greatest sum of the first score and the weighted second score as the target candidate text from among the candidate texts; and recognize the target candidate text to correspond to a portion of the input speech.

19. The speech recognition apparatus of claim 18, wherein the processor is further configured to:
   extract a feature value from the input speech; and
   determine the weight using a neural network-based weight determiner configured to output a weight corresponding to the extracted feature value.

20. The speech recognition apparatus of claim 18, wherein the language model comprises a first language model configured to output a second score of the candidate texts and a second language model configured to output a third score of the candidate texts; and
   the processor is further configured to:
   determine a first weight to be applied to the second score and a second weight to be applied to the third score, and
   select the target candidate text based on the first score, the second score to which the first weight is applied, and the third score to which the second weight is applied.

21. The speech recognition apparatus of claim 18, wherein the language model comprises a plurality of language models,
   wherein the processor is further configured to:
   select at least one language model to which the weight is to be applied from among the plurality of language models; and
   determine a weight to be applied to an output of the at least one language model.

22. The speech recognition apparatus of claim 18, wherein the processor is further configured to determine a weight to be applied to an output of the language model at a current time based on the input speech and a target text determined at a previous time.

23. A speech recognition apparatus comprising:
   a sensor configured to receive a speech;
   a memory configured to store language models and instructions; and
   a processor configured to execute the instructions to:
   implement an encoder configured to encode the speech,
   implement a decoder configured to determine a first score of candidate texts based on the encoded speech,
   implement a weight determiner configured to determine a weight for each of the respective language models based on an output of the encoder,
   determine a corresponding second score for the candidate texts based on each of the respective language models,
   apply the weight for each of the respective language models to the second score of the candidate texts obtained from each of the respective language models to obtain a weighted second score, and
   recognize a target candidate text from among the candidate texts, to correspond to a portion of the speech, based on a sum of the first score and the weighted second score corresponding to the target candidate text.

24. The speech recognition apparatus of claim 23, wherein the encoder is further configured to extract a feature value from the speech and the decoder is configured to output the candidate texts and the first score based on the feature value.

25. The speech recognition apparatus of claim 23, wherein the weight determiner is further configured to increase a weight of a language model corresponding to contact information stored on a device implementing the speech recognition apparatus, in response to an user name being detected in the speech.

26. The speech recognition apparatus of claim 23, wherein the weight determiner is further configured to determine the weight for each of the respective language models based on the output of the encoder and a previously determined target text.

27. The speech recognition apparatus of claim 23, wherein the weight determiner is further configured to determine the weight for each of the respective language models based on the output of the encoder and a context information, and the context information comprises any one or any combination of a situation in which the speech is made, user information, information associated with a current location, a current time, a currently operating program, a speech recognition history, and a dialog history of the user.

28. The speech recognition apparatus of claim 23, wherein each of the encoder, the decoder, and the weight determiner is implemented on a neural network.

* * * * *